United States Patent [19]
Gilmour

[11] Patent Number: 5,537,366
[45] Date of Patent: Jul. 16, 1996

[54] BURIED CABLE PIPE DETECTION SONAR

[75] Inventor: George A. Gilmour, Severna Park, Md.

[73] Assignee: Northrop Grumman, Baltimore, Md.

[21] Appl. No.: 497,917

[22] Filed: Jul. 3, 1995

[51] Int. Cl.⁶ .................................................. G01S 15/00
[52] U.S. Cl. .............................................................. 367/88
[58] Field of Search .................................. 367/87, 88, 92, 367/135, 137, 138, 131, 104, 105

[56] References Cited

U.S. PATENT DOCUMENTS

| | | | |
|---|---|---|---|
| Re. 31,026 | 9/1982 | Shatto | 367/106 |
| 3,950,723 | 4/1976 | Gilmour | 367/88 |
| 4,075,599 | 2/1978 | Kosalos et al. | 367/87 |
| 4,187,556 | 2/1980 | Jones | 367/155 |
| 4,216,537 | 8/1980 | Delignieres | 367/88 |
| 4,247,923 | 1/1981 | De Kok | 367/88 |
| 4,958,330 | 9/1990 | Higgins | 367/88 |
| 4,970,700 | 11/1990 | Gilmour et al. | 367/88 |
| 5,025,423 | 6/1991 | Earp | 367/137 |
| 5,177,710 | 1/1993 | Gilmour et al. | 367/88 |

OTHER PUBLICATIONS

*Non–Linear Acoustics,* Robert T. Beyer, Naval Sea Systems Command, Department of the Navy, 1974, pp. 336–371.
*Development of High Resolution Side–look Sonars,* (presented at the Acoustical Society of America meeting, 9–12 Nov., 1982, Orlando, FL)–Arthur Nelkin and George A. Gilmour, Westinghouse Elec. Corp., Oceanic Div., P.O. Box 1488, Annapolis, MD 21404.

*Primary Examiner*—Ian J. Lobo
*Attorney, Agent, or Firm*—C. O. Edwards

[57] ABSTRACT

A low frequency sonar system for detecting buried cables and pipelines that includes at least three sub-bottom sonar beam projectors arranged athwarships, i.e. transverse to the central longitudinal axis of the system platform and a common receiver, the latter preferably being an arc focused device. The projectors are comprised of parametric transmitters, with the two outer projectors canted relative to the middle projector so that sonar return signals having a relatively narrow beamwidth are directed to the bottom and returned as a sequence of specular reflections along the length of sub-bottom targets to the common receiver. The transmission from the three parametric transmitters result in three spaced apart "hits" on the target which are displayed as a function of depth. Three detections in a row, i.e. at the same depth, provide an indication of a cable or pipeline buried beneath the bottom of a body of water.

18 Claims, 2 Drawing Sheets 5,537,366

BURIED CABLE PIPE DETECTION SONAR

BACKGROUND OF THE INVENTION

This invention relates generally to sonar apparatus and more particularly to low frequency sonar apparatus which can penetrate the bottom of a body of water and detect sub-bottom targets.

It has become common practice to bury cables and pipelines to avoid damage due to bottom fishing activities and anchors and as a result there is a need to detect disabled cables and pipelines for repair.

It is well known that low frequency sonar operating below 40 kHz can penetrate the sea bottom and detect buried objects; however, in present state-of-the art systems, the apparatus used to detect a buried cable results in an excessive false alarm rate which makes detection of linear targets such as cables and pipelines, very difficult, if not impossible.

SUMMARY

Accordingly, it is an object of the present invention to provide an improvement in sonar apparatus.

It is a another object of the invention to provide an improvement in bottom penetrating sonar apparatus.

It is a further object of the invention to provide a sonar system which can penetrate the bottom and detect a line target.

It is still another object of the invention to provide a sonar system which is able to detect cables and pipelines buried under the bottom of the body of water while distinguishing them from a rock stratum.

These and other objects are achieved by a relatively low frequency sonar system that is comprised of at least three sub-bottom sonar beam projections arranged athwarships, i.e. transverse to the central longitudinal axis of the system platform and a common receiver including the acoustic transducer therefor, the latter preferably comprising an arc focused device. The projectors are comprised of parametric transmitters, with the two outer projectors canted relative to the middle projector so that sonar return signals having a relatively narrow beamwidth are directed to the bottom and returned as separate specular reflections along the length of sub-bottom targets to the common receiver. The transmission from the three parametric transmitters result in three spaced apart "hits" on the target which are displayed as a function of depth. Three detections in a row, i.e. at the same depth, provide an indication of a linear target such as a section of cable or pipeline buried beneath the bottom of a body of water.

BRIEF DESCRIPTION OF THE DRAWINGS

The following detailed description of the invention will be more readily understood when considered together with the accompanying drawings wherein.

DESCRIPTION OF THE PREFERRED EMBODIMENT

This invention is directed to bottom penetrating sonar apparatus where the targets of interest, namely buried cables and pipelines require their being located. Such targets provide a specular return. Since they are buried parallel to the bottom, a sonar aimed straight down will be able to detect this specular return; however, the false alarm rate for a single detection of a target as it is crossed over will be relatively high, since any pebble or other piece of material will return a comparable signal. Accordingly, since buried cables and pipelines constitute a straight line target, apparatus for obtaining multiple detections indicating a straight line target will now be described.

Figure 1:
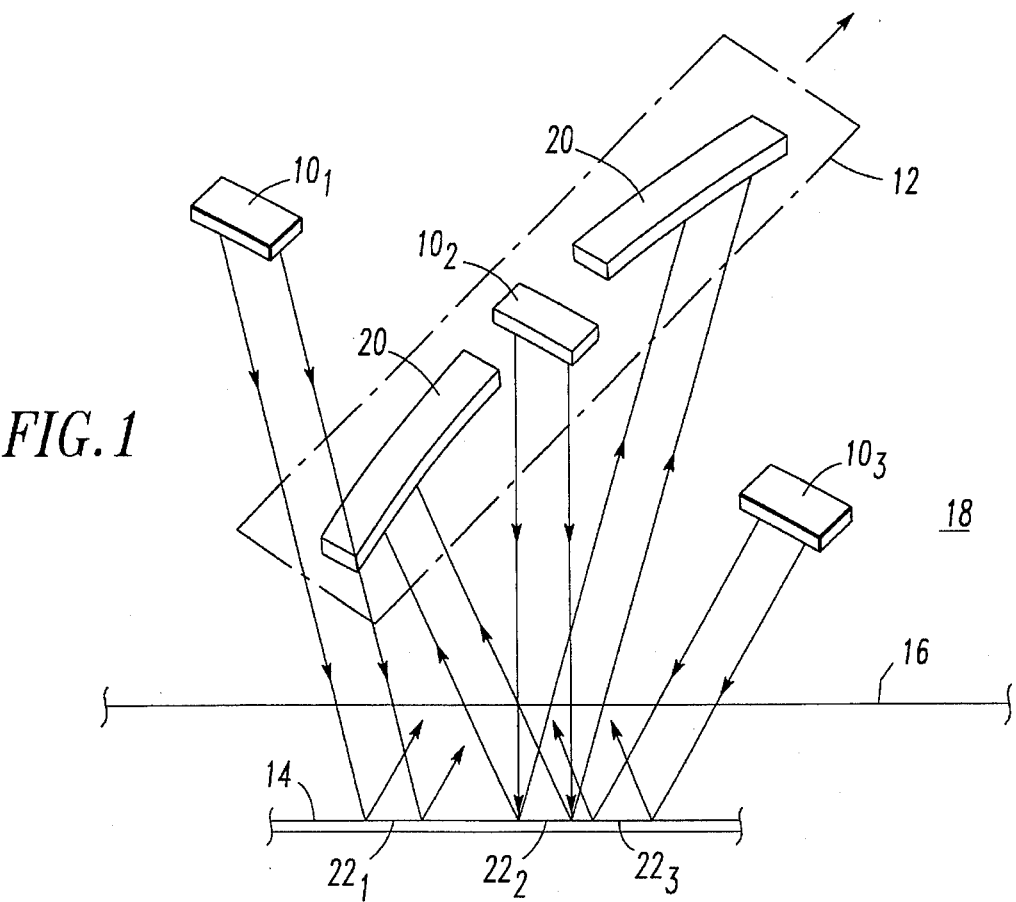
FIG. 1 is a view of the preferred embodiment of the invention which illustrates the system geometry involved.
Figure 2:
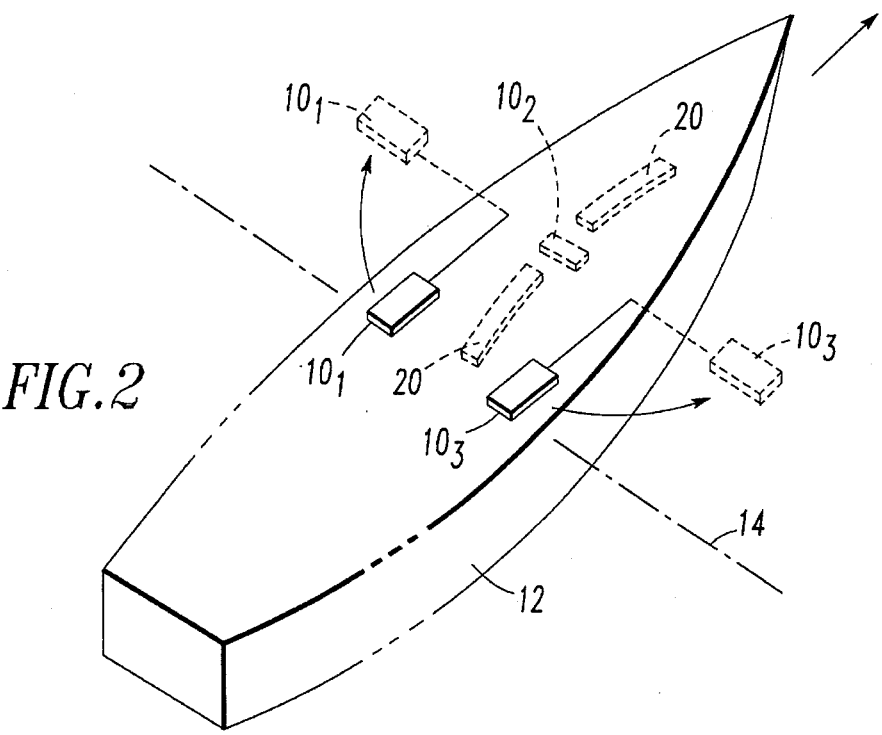
FIG. 2 is a diagram illustrative of a vessel which acts as a platform for sonar apparatus shown in FIG. 1.

Referring now to the drawings and more particularly to FIGS. 1 and 2, the preferred embodiment of the invention is shown comprising, inter alia, three sub-bottom sonar beam projectors denoted by reference numerals $10_1$, $10_2$ and $10_3$. The projectors are adapted to be aligned transverse to the central longitudinal axis of a sonar system platform 12 and which consists of a water vehicle such as a surface vessel as shown in FIG. 2. In nautical terms, they are arranged athwartships or across the beam so they are parallel to a linear target of interest 14, namely a disabled cable or pipeline in need of repair when the vessel passes over the target at right angles thereto.

As shown in FIG. 1, the target 14 lies buried below the bottom surface 16 of a body of water 18. The three sonar beam projectors $10_1$, $10_2$ and $10_3$ are preferably comprised of parametric transmitters and are arranged to the port, center and starboard of the vessel 12. A parametric transmitter is well known in the art of sonar technology and comprises an ultrasonic parametric array which generates a very sharp beam devoid of sidelobes and which generates a relatively low frequency output by mixing two relatively high frequencies. Such apparatus is disclosed, for example, in Chapter 10, pp. 336–371 of a publication entitled, *Non-Linear Acoustics*, Robert T. Beyer and published by the Naval Sea Systems Command, Department of the Navy, 1974. The three parametric transmitters $10_1$, $10_2$ and $10_3$ accordingly generate respective low frequency (<40 kHz) bottom penetrating sonar pulses having beamwidths of less than 2°. These pulses are directed straight down toward the bottom 16 of a body of water 18.

Associated with the three parametric transmitters $10_1$, $10_2$ and $10_3$ is a single sonar receiver transducer 20 which is mounted on the body of the sonar platform, i.e. the vessel 12 shown in FIG. 2. The transducer 20, moreover, preferably comprises an arc focused type transducer assembly which is also well known in the art and is oriented such that it is adjacent the middle transmitter $10_2$. A typical example of an arc focused electro-acoustic transducer is furthermore shown and described in U.S. Pat. No. 4,187,556 issued to C. H. Jones on Feb. 5, 1980. The arc focused receiver transducer 20 comprises an elongated structure and is oriented so that its lengthwise dimension is in line with the direction of travel of the host vehicle 12.

Further as shown in FIGS. 1 and 2, the receiver transducer 20 is split into two halves, with each half being located on either side of the center projector $10_2$. However, the receiver transducer 20 can, when desirable, be a single unit located either fore or aft of the projector $10_2$.

The receiver transducer 20 is designed to be responsive to specular reflections of targets within a limited range of depths beneath the sea floor 16. The outer two projectors 10₁ and 10₂ are canted so that specular reflections from the same target under the bottom 16 reflect to the same receiver transducer 20 along with reflections from the center projector 10₂. When desirable, an unfocused receiver may be used for large cables and pipelines; however, the signal processing must be able to distinguish between detections of a rock stratum and the target in question.

Therefore, the task of the subject apparatus is to sense three detections in a row at the same depth which would be provided by the hits on a target 14 as shown in FIG. 1 and designated by reference numerals 22₁, 22₂ and 22₃.

Figure 3A:
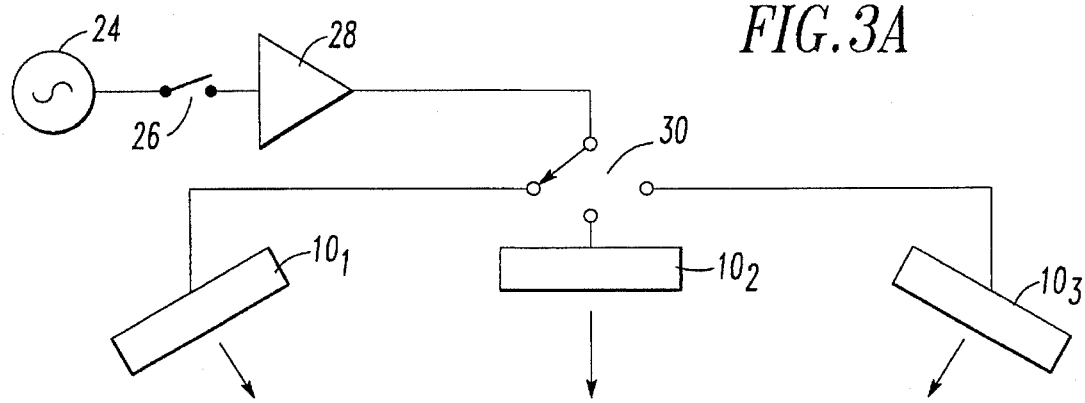
FIG. 3A is an electrical schematic diagram illustrative of the sonar transmitter portion of the preferred embodiment of the subject invention.
Figure 3B:
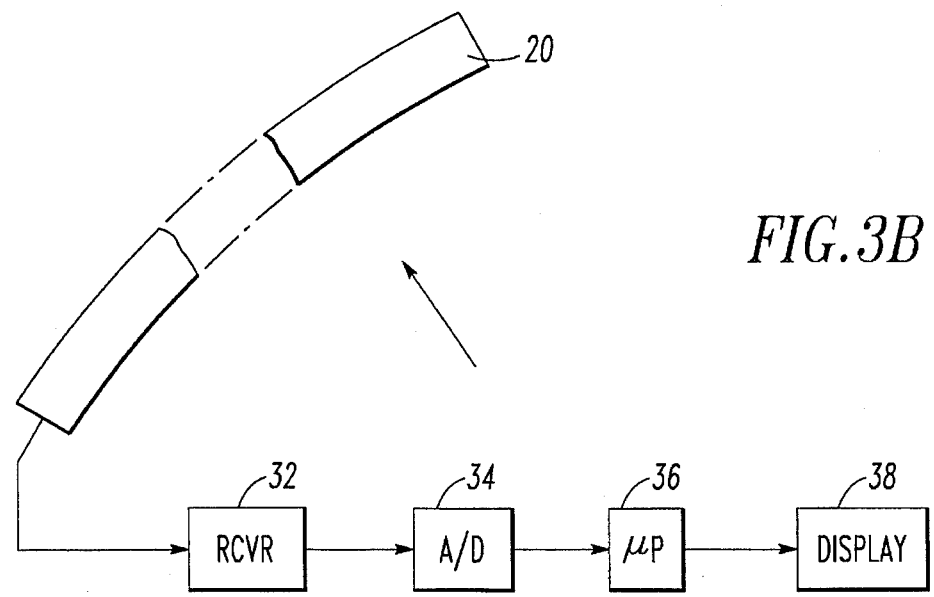
FIG. 3B is an electrical schematic diagram illustrative of the receiver portion of the preferred embodiment of the subject invention.

Referring now to FIGS. 3A and 3B, finding three sonar hits in a row is achieved by a low frequency sonar source which operates below 40 kHz and shown by reference numeral 24. Sonar pulses are gated from the low frequency source 24 and sequentially fed to the three sonar projectors 10₁, 10₂ and 10₃ by means of an electronic gating device 26, a transmit power amplifier 28, and an electrical switch device shown by reference numeral 30. Thus the sonar hits 22₁, 22₂ and 22₃ return in sequence with the specular returns thereof impinging on the common receiver transducer 20. The output of the transducer 20 is fed to a signal receiver unit 32. The output of the receiver 32 is fed to an analog to digital (A/D) converter 34 which is coupled to the input of a microprocessor 36 which is programmed to determine the depth of the sonar return to the transducer 20. Signals generated by the microprocessor 36 drive a visual display device 38.

Figure 4:
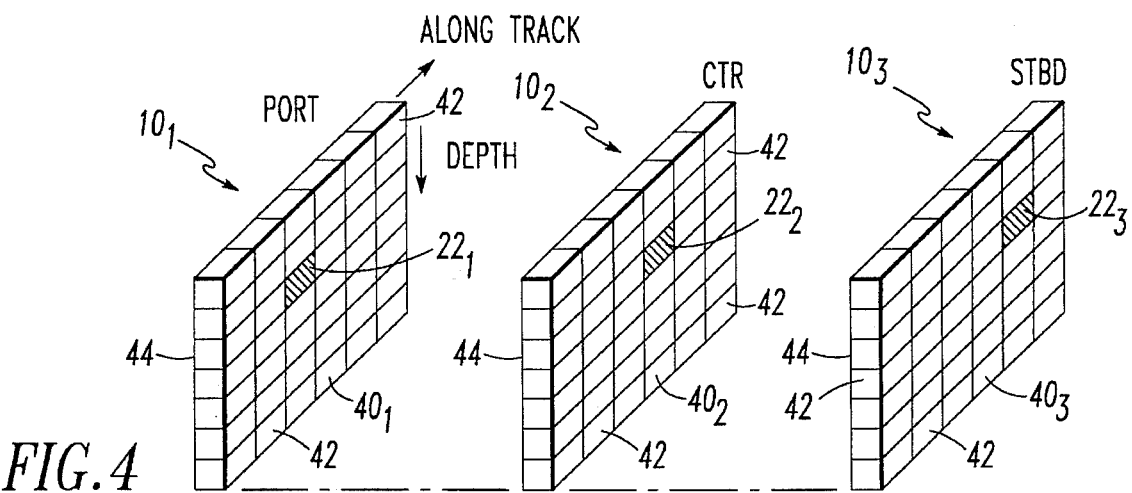
FIG. 4 is a diagram illustrative of the target detection technique implemented by the subject invention.

The target detection technique embodied in the apparatus shown, for example in the embodiment of the invention shown schematically in FIGS. 3A and 3B, is to find three detections in a line at the same depth as depicted in FIG. 4, where, for example, reference numeral 40₁ is illustrative of a matrix of image cells 42 generated as a function of depth for progressive travel of the port side profiler 10₁. Reference numeral 40₂ denotes the image cell matrix for the center profiler 10₂ and reference numeral 40₃ denotes the image cells for the starboard profiler 10₃. As can be seen in FIG. 4, three detections of "hits" 22₁, 22₂ and 22₃ occur at the same depth, but in successive cell locations along the same horizontal row 44 of image cells.

The microprocessor 36 in effect operates to search for detections at the same depth from hits transmitted by the projectors 10₁, 10₂ and 10₃. One scenario would search for detections on either side of the center profiler 10₂, while verifying that the detection does not exist outside of the line so as to eliminate rock strata specular reflections. It should be noted, however, that any suitable variation of this scheme can be used.

Accordingly, what has been shown and described is a sonar system that uses an arrangement of three low frequency parametric transmitters and one common receiver, preferably an arc focused receiver to detect specular reflections from sub-bottom targets, e. g. cables and pipelines, that are buried parallel to the bottom of a body of water.

Having thus shown and described what is at present considered to be the preferred embodiment of the invention, it is to be noted that the same has been made by way of illustration and not limitation. Accordingly, all modifications, alterations and changes coming within the spirit and scope of the invention as set forth in the appended claims are herein meant to be included.

What is claimed is:

1. Sonar apparatus for detecting sub-bottom targets, comprising:
   a platform for sonar apparatus and having a central longitudinal axis directed along a normal direction of travel;
   a plurality of mutually aligned and spaced apart sonar beam projectors oriented so as to be transverse to said central longitudinal axis of said platform and operating at a bottom penetrating frequency;
   means for generating and applying sonar signal transmissions sequentially to a target from each of said plurality of beam projectors;
   detecting means located for detecting a sequence of specular reflections of said sonar signal transmissions striking said target;
   means for processing said detected signals and generating output signals including a parameter of depth of the target; and
   means for displaying said output signals, whereby at least three detections in a straight line and at the same depth is indicative of a linear target.

2. Apparatus according to claim 1 wherein said means for generating and applying sonar signal transmissions includes parametric transmission means.

3. Apparatus according to claim 2 wherein said plurality of beam projectors comprises at least three of said beam projectors.

4. Apparatus according to claim 3 wherein two of said at least three beam projectors comprise outer beam projectors and are canted relative to a middle beam projector of said at least three beam projectors.

5. Apparatus according to claim 4 wherein said at least three beam projectors are substantially equally spaced.

6. Apparatus according to claim 4 wherein said platform comprises a water vehicle and said two beam projectors are located in proximity to the port and starboard side of said water vehicle and said middle beam projector is located between said two beam projectors on said water vehicle.

7. Apparatus according to claim 6 wherein said two beam projectors are located off the port and starboard side of said water vehicle.

8. Apparatus according to claim 6 wherein said detecting means is located adjacent the middle beam projector.

9. Apparatus according to claim 8 wherein said detecting means is aligned with the central longitudinal axis of said water vehicle.

10. Apparatus according to claim 9 wherein said detecting means comprises an elongated detector of sonar signal transmission.

11. Apparatus according to claim 10 wherein said elongated detector comprises an arc focused electro-acoustic transducer.

12. Apparatus according to claim 11 wherein said arc focused electro-acoustic transducer comprises a segmented transducer including at least one portion thereof located on both sides of said middle beam projector.

13. A method for detecting sub-bottom targets from a platform on which the sonar apparatus is mounted, with the platform having a central longitudinal axis directed along a normal direction of travel, comprising the steps of:
   (a) generating and applying sonar signal transmissions sequentially to a target from a plurality of mutually aligned and spaced apart sonar beam projectors oriented so as to be transverse to said central longitudinal axis of said platform and operating at a bottom penetrating frequency;

(b) detecting a sequence of specular reflection signals of said sonar signal transmissions striking said target;

(c) processing said detected specular reflection signals and generating output signals including a parameter of depth of the target; and (d) displaying said output signals, whereby at least three detections in a straight line and at the same depth is indicative of a linear target.

14. A method according to claim 13 wherein said frequency is below 40 KHz.

15. A method according to claim 13 wherein said sonar beam projections are comprised of parametric transmitter apparatus.

16. A method according to claim 13 wherein said detecting step (b) comprises detecting said specular reflections with an elongated electro-acoustic transducer.

17. A method according to claim 13 wherein said platform comprises a water vehicle and said electro-acoustic transducer is aligned with the central longitudinal axis thereof.

18. A method according to claim 17 wherein said electro-acoustic transducer comprises an arc focused transducer.

* * * * *